(12) United States Patent
Trimmer et al.

(10) Patent No.: US 9,753,870 B2
(45) Date of Patent: Sep. 5, 2017

(54) HARDWARE MONITOR WITH CONTEXT SWITCHING AND SELECTION BASED ON A DATA MEMORY ACCESS AND FOR RAISING AN INTERRUPT WHEN A MEMORY ACCESS ADDRESS IS OUTSIDE OF AN ADDRESS RANGE OF THE SELECTED CONTEXT

(71) Applicant: STMicroelectronics R&D Ltd, Marlow, Buckinghamshire (GB)

(72) Inventors: Mark Trimmer, Clifton (GB); Paul Elliott, Bristol (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 551 days.

(21) Appl. No.: 13/705,315

(22) Filed: Dec. 5, 2012

(65) Prior Publication Data
US 2013/0159661 A1 Jun. 20, 2013

(30) Foreign Application Priority Data
Dec. 16, 2011 (GB) .................................. 1121680.1

(51) Int. Cl.
G06F 12/14 (2006.01)
G06F 9/46 (2006.01)
G06F 11/30 (2006.01)
G06F 12/02 (2006.01)

(52) U.S. Cl.
CPC .......... *G06F 12/1458* (2013.01); *G06F 9/46* (2013.01); *G06F 11/3027* (2013.01); *G06F 12/0223* (2013.01); *G06F 12/1441* (2013.01)

(58) Field of Classification Search
CPC ........ G06F 9/46; G06F 11/3003; G06F 12/14; G06F 12/1416; G06F 12/1441; G06F 21/00; G06F 21/50; G06F 11/3027; G06F 12/1458
See application file for complete search history.

(56) References Cited

U.S. PATENT DOCUMENTS

| 5,263,147 A | 11/1993 | Francisco et al. |
| 6,052,801 A * | 4/2000 | Hammond et al. ......... 714/38.13 |
| 6,092,155 A * | 7/2000 | Olnowich ........... G06F 12/0817 711/142 |
| 6,282,657 B1 * | 8/2001 | Kaplan et al. .................... 726/1 |
| 6,567,839 B1 * | 5/2003 | Borkenhagen ........ G06F 9/3009 718/103 |

(Continued)

FOREIGN PATENT DOCUMENTS

GB 2448151 A 10/2008

OTHER PUBLICATIONS

UKIPO Search Report for GB1121680.1 mailed Mar. 29, 2012 (4 pages).

(Continued)

*Primary Examiner* — David J Huisman
(74) *Attorney, Agent, or Firm* — Gardere Wynne Sewell LLP

(57) ABSTRACT

A monitor includes a register configured to store at least two contexts and a context change value. A context selector is configured to select at least one of the two contexts for context monitoring. The selection is made dependent on whether the context change value matches a first part of a memory access address.

11 Claims, 12 Drawing Sheets

(56) References Cited

U.S. PATENT DOCUMENTS

| | | | |
|---|---|---|---|
| 6,587,967 B1* | 7/2003 | Bates | G06F 11/3664 |
| | | | 714/35 |
| 7,865,704 B2* | 1/2011 | Moyer | 712/227 |
| 2002/0065646 A1* | 5/2002 | Waldie et al. | 703/26 |
| 2002/0184477 A1* | 12/2002 | Swaine et al. | 712/227 |
| 2003/0140205 A1* | 7/2003 | Dahan et al. | 711/163 |
| 2004/0153672 A1* | 8/2004 | Watt et al. | 713/201 |
| 2005/0257089 A1* | 11/2005 | Williams et al. | 714/34 |
| 2006/0005072 A1* | 1/2006 | Philippe Conti et al. | 714/5 |
| 2006/0130068 A1* | 6/2006 | Rohr | G06F 9/4443 |
| | | | 718/107 |
| 2006/0136634 A1* | 6/2006 | Gardner | 710/107 |
| 2008/0244155 A1 | 10/2008 | Lee et al. | |
| 2011/0258421 A1* | 10/2011 | Elnozahy | G06F 11/3636 |
| | | | 712/227 |

OTHER PUBLICATIONS

First Office Action and Search Report for co-pending CN Appl. No. 201210563592.9 dated Jun. 20, 2016 (13 pages).

\* cited by examiner

FIG. 12

| SIGNAL NAME | I/O | TIMING | DESCRIPTION | LOGICAL GROUPING |
|---|---|---|---|---|
| rst_n | I | async | SYSTEM RESET | SYSTEM |
| clk_stbus | I | | STBus CLOCK | STBus PORT |
| priv_t1_req | I | LATE | 8-BIT PRIVATE T1 STBus TARGET PORT | STBus PORT |
| priv_t1_addr<11:0> | I | LATE | | |
| priv_t1_opc<3:0> | I | LATE | | |
| priv_t1_data<7:0> | I | LATE | | |
| priv_t1_r_req | O | EARLY | | |
| priv_t1_r_data<7:0> | O | EARLY | | |
| clk_cpu | I | | CLOCK OF CPU BEING MONITORED | MONITOR |
| cpu_ifetch_addr<31:4> | I | LATE | INSTRUCTION BUS OF CPU BEING MONITORED | |
| cpu_ifetch_active | I | LATE | INDICATES WHETHER INSTRUCTION IS BEING FETCHED | |
| cpu_ifetch_sup | I | LATE | INDICATES SUPERVISOR OR USER 1 = SUPERVISOR, 0 = USER | |
| cpu_dfetch_d_addr<31:4> | I | LATE | ADDRESS OF THE DATA FETCH | |
| cpu_dfetch_active | I | LATE | INDICATES WETHER DATA IS BEING ACCESSED | |
| cpu_dfetch_rnw | I | LATE | INDICATES WETHER DATA IS BEING WRITTEN OR READ FROM AN ADDRESS 0 = WRITE, 1 = READ | |
| fetch_exception | O | EARLY | INDICATES THAT THE RULES HAVE BEEN VIOLATED | EXCEPTION TO CRYPTOCORE |
| cm_cid<5:0> | O | EARLY | 6-BIT ST231 COMPARTMENT ID SHOULD BE CONNECTED AT SOC LEVEL TO DRIVE THE ST231'S STBUS CID OUTPUT | ST231's COMPARTMENT ID |
| tst_reset_mux | I | | FOR USE IN RESET RESYNCHRONIZER | TEST |
| tst_gclkenable_power | I | | STANDARD SCAN SIGNALS | TEST |
| tst_scanenable | I | | | |
| tst_scanin<49:0> | I | | | |
| tst_scanout<49:0> | O | | | |

1601 groups: cpu_ifetch_addr<31:4>, cpu_ifetch_active, cpu_ifetch_sup
1603 groups: cpu_dfetch_d_addr<31:4>, cpu_dfetch_active, cpu_dfetch_rnw
1605 groups: fetch_exception

FIG. 13

| | BYTE ADDRESS | NAME | FUNCTION |
|---|---|---|---|
| 1101 | 16n + 0x0 (FOR n = 0 TO 63) | ifetch_region_<n>_lower | LOWER BOUND OF iregion n |
| | 16n + 0x4 (FOR n = 0 TO 63) | ifetch_region_<n>_upper | UPPER BOUND OF iregion n |
| | 16n + 0x8 (FOR n = 0 TO 63) | ifetch_region_<n>_tag | TAG NUMBER OF iregion n |
| | 16n + 0xC (FOR n = 0 TO 63) | ifetch_region_<n>_sup_en | ENABLE AND SUPERVISOR/USER CONTROL |
| 1103 | 0x400 + 16n + 0x0 (FOR n = 0 TO 63) | dfetch_region_<n>lower | LOWER BOUND OF dregion n |
| | 0x400 + 16n + 0x4 (FOR n = 0 TO 63) | dfetch_region_<n>_upper | UPPER BOUND OF dregion n |
| | 0x400 + 16n + 0x8 (FOR n = 0 TO 63) | dfetch_region_<n>_config | ENABLE AND READ-ONLY CONTROL |
| | 0x400 + 16n + 0xC (FOR n = 0 TO 63) | RESERVED | |
| 1105 | 0x800 | failure_status | STATUS REGISTER |
| | 0x804 | ifetch_failure_addr | ILLEGITIMATE i-fetch ADDRESS WHICH CAUSED AN EXCEPTION |
| | 0x808 | dfetch_failure_addr | DATA ADDRESS ACCESSED BY INSTRUCTION THAT CAUSED AN EXCEPTION (IF RELEVANT) |
| | 0x80C | ifetch_good_addr | i-fetch ADDRESS OF LAST GOOD ACCESS |
| 1107 | 0x818 | context_address | THE VALUE WRITTEN INTO HERE BY THE CRYPTOCORE IS "SysAddr" (SEE *Detailed functional description*) |
| 1109 | 0xC00 - 0xC1C | CID(n) | 0xC00 + n*4 CONTAINS THE 6-BIT CID VALUE TO BE USED BY CONTEXT n |

| ifetch_region_n_lower | | 16n + 0x0 (FOR n = 0 TO 63) | RW |
|---|---|---|---|
| BIT | BIT FIELD | RESET STATE | FUNCTION |
| 3:0 | RESERVED | 0x0 | READ RETURNS 0, WRITES IGNORED |
| 31:4 | VALUE | 0x0000000 | LOWER ADDRESS BOUND OF iregion n |

FIG. 14

| ifetch_region_n_upper | | 16n + 0x4 (FOR n = 0 TO 63) | RW |
|---|---|---|---|
| BIT | BIT FIELD | RESET STATE | FUNCTION |
| 3:0 | RESERVED | 0x0 | READ RETURNS 0, WRITES IGNORED |
| 31:4 | VALUE | 0x0000000 | UPPER ADDRESS BOUND OF iregion n |

FIG. 15

| ifetch_region_n_tag | | 16n + 0x8 (FOR n = 0 TO 63) | RW |
|---|---|---|---|
| BIT | BIT FIELD | RESET STATE | FUNCTION |
| 7:0 | VALUE | 0x0 | TAG VALUE FOR iregion n |
| 31:8 | RESERVED | 0x0000000 | READ RETURNS 0, WRITES IGNORED |

FIG. 16

| ifetch_region_n_sup_en | | 16n + 0xC (FOR n = 0 TO 63) | RW |
|---|---|---|---|
| BIT | BIT FIELD | RESET STATE | FUNCTION |
| 0 | ENABLE | 0x0 | 1 = ENABLE, 0 = DISABLE |
| 1 | SUPERVISOR | 0x0 | 1 = SUPERVISOR, 0 = USER |
| 2 | Sup_enable | 0x0 | 1 = ENABLE, 0 = DISABLE |
| 31:3 | RESERVED | 0x0000000 | READ RETURNS 0, WRITES IGNORED |

FIG. 17

| dfetch_region_n_lower | | 0x400 + 16n + 0x0 (FOR n = 0 TO 63) | | RW |
|---|---|---|---|---|
| BIT | BIT FIELD | RESET STATE | FUNCTION | |
| 3:0 | RESERVED | 0x0 | READ RETURNS 0, WRITES IGNORED | |
| 31:4 | VALUE | 0x0000000 | LOWER ADDRESS BOUND OF dregion n | |

FIG. 18

| dfetch_region_n_upper | | 0x400 + 16n + 0x4 (FOR n = 0 TO 63) | | RW |
|---|---|---|---|---|
| BIT | BIT FIELD | RESET STATE | FUNCTION | |
| 3:0 | RESERVED | 0x0 | READ RETURNS 0, WRITES IGNORED | |
| 31:4 | VALUE | 0x0000000 | UPPER ADDRESS BOUND OF dregion n | |

FIG. 19

| dfetch_region_n_config | | 0x400 + 16n + 0x8 (FOR n = 0 TO 63) | | RW |
|---|---|---|---|---|
| BIT | BIT FIELD | RESET STATE | FUNCTION | |
| 0 | rnw | 0x0 | DETERMINES RO/RW STATE OF THE dregion 1 = RO | |
| 1 | ENABLE | 0x0 | ENABLES THE dregion | |
| 31:2 | RESERVED | 0x0000000 | READ RETURNS 0, WRITES IGNORED | |

FIG. 20

| failure_status | | 0x800 | | RW |
|---|---|---|---|---|
| BIT | BIT FIELD | RESET STATE | FUNCTION | |
| 0 | ifetch | THE REGISTER IS RESET BY WRITING TO IT | SET ON AN ifetch OUTSIDE ANY ACTIVE iregion (PROVIDED failure_status=0) | |
| 1 | COMB | | SET ON AN INVALID ifetch/dfetch COMBINATION (PROVIDED failure_status=0) | |
| 31:2 | RESERVED | | READ RETURNS 0, WRITES IGNORED | |

FIG. 21

| ifetch_failure_addr | | 0x804 | RO |
|---|---|---|---|
| BIT | BIT FIELD | RESET STATE | FUNCTION |
| 0 | sup | UNDEFINED | THE SUPERVISOR MODE WHEN AN EXCEPTION WAS RAISED |
| 3:1 | CONTEXT | | THE ACTIVE CONTEXT WHEN AN EXCEPTION WAS RAISED |
| 31:4 | VALUE | | THE CODE ADDRESS CAUSING THE EXCEPTION |

FIG. 22

| dfetch_failure_addr | | 0x810 | RO |
|---|---|---|---|
| BIT | BIT FIELD | RESET STATE | FUNCTION |
| 0 | rnw | UNDEFINED | SAYS WHETHER THE FAILING DATA ACCESS WAS A READ OR A WRITE |
| 3:1 | RESERVED | | READS '0' |
| 31:4 | VALUE | | THE DATA ADDRESS WHICH CAUSED THE failure_status.comb BIT TO BE SET |

FIG. 23

| ifetch_good_addr | | 0x814 | | RO |
|---|---|---|---|---|
| BIT | BIT FIELD | RESET STATE | FUNCTION | |
| 3:0 | RESERVED | UNDEFINED | READS '0' | READS ONLY RELIABLE IF failure_status.ifetch SET) |
| 31:4 | VALUE | | THE LAST INSTRUCTION EXECUTED THAT WAS FROM AN ENABLED iregion | |

FIG. 24

| context_address | | 0x818 | READABLE - WRITABLE ONLY ONCE AFTER RESET |
|---|---|---|---|
| BIT | BIT FIELD | RESET STATE | FUNCTION |
| 3:0 | RESERVED | 0x0 | READS '0' |
| 6:4 | current_context | 0x0 | READS GIVE THE CURRENT CONTEXT. WRITES TO THESE BITS HAVE NO EFFECT |
| 31:7 | VALUE | 0x0000000 | THE CRYPTOCORE WRITES A VALUE INTO THIS REGISTER THAT IS A SYSTEM ADDRESS THAT ST231 0522 KERNEL CODE MUST ACCESS WHENEVER IT WANTS TO CHANGE CURRENT CONTEXT. THIS SYSTEM ADDRESS SHOULD BE THE BASE OF A 128 BYTE-SPACE TO WHICH ACCESSES ARE HARMLESS. BITS 31:7 OF THIS REGISTER ARE COMPARED WITH THE cpu_dfetch_addr FROM THE ST231, AND WHEN IT MATCHES, cpu_dfetch_addr(6:4) DETERMINES THE NEW CONTEXT |

FIG. 25

| CID_n | | 0xC00 + n*4 (FOR n = 0 TO 7) | RW |
|---|---|---|---|
| BIT | BIT FIELD | RESET STATE | FUNCTION |
| 5:0 | CID | 0x0 | CONTAINS THE 6-BIT CID VALUE TO BE USED BY CONTEXT n |
| 31:6 | RESERVED | 0x0000000 | READS OF THESE BITS ARE UNDEFINED |

FIG. 26

HARDWARE MONITOR WITH CONTEXT SWITCHING AND SELECTION BASED ON A DATA MEMORY ACCESS AND FOR RAISING AN INTERRUPT WHEN A MEMORY ACCESS ADDRESS IS OUTSIDE OF AN ADDRESS RANGE OF THE SELECTED CONTEXT

PRIORITY CLAIM

This application claims priority from Great Britain Application for Patent No. 1121680.1 filed Dec. 16, 2011, the disclosure of which is incorporated by reference.

TECHNICAL FIELD

The present application relates to a hardware monitor and in particular but not exclusively a hardware monitor for monitoring data flow for multiple contexts within a processor.

BACKGROUND

Hardware monitors attached to central processing units (CPU) for checking software are known. The hardware monitor typically checks software being executed on the CPU to determine that the software is executing and accessing data between permitted regions. For example, the hardware monitor can be configured to detect when an instruction falls outside a permitted region and can be maliciously inserted or where data is being read from a memory space or written to a memory space outside a permitted region with similar associated security issues.

These hardware monitors, sometimes known as fetch monitors, can be implemented on integrated circuits sitting next to a CPU monitoring memory accesses and checking whether processes (supervisor and user) are staying within predefined boundaries. A common cause of processes accessing instructions or data outside their defined boundaries is the operation of 'hacked software'. When detecting that software has been hacked the fetch monitor or hardware monitor can quickly force a chip reset to prevent illegitimate accesses being performed.

Central processing units have the ability to run concurrent software processes, for example a CPU may have multiple user processes operating on a CPU, each user process has an associated user context defining; a set of memory regions that the user process is allowed to fetch instructions from, a set of memory regions from which the user process is allowed to read data from and, a set of memory regions from which the user process is allowed to write data to. Current CPU and hardware monitor design is flawed in that, each time the user process is changed, the CPU has to perform a hardware register access from the CPU to the hardware monitor over the system bus which can take tens of hundreds of clock cycles before the hardware monitor is set to monitor for the new user process.

SUMMARY

In an embodiment, a hardware/fetch monitor system suitable for performing access checking and monitoring is provided where a CPU or group of CPU's can perform concurrent software operations and the hardware monitor can switch between processes within a single instruction cycle.

According to a first aspect of the application there is provided a monitor comprising: a register configured to store at least two contexts and a context change value; and a context selector configured to select at least one of the two contexts for context monitoring dependent on determining the context change value matching a first part of a memory access address.

Each of the at least two contexts may be associated with an identifier value; and wherein the context selector may be configured to select the at least one of the two contexts for context monitoring dependent on a second part of the memory access address matching a context associated identifier value.

Each context may comprise at least one of: an instruction region; a data read region; and a data write region.

The monitor may be further configured to receive a data access memory address wherein the data access memory address may be the memory access address.

The monitor may further be configured to receive a supervisor mode indicator signal indicating a CPU is operating in a supervisor mode.

The monitor may further comprise an address monitor configured to receive a memory access address and compare the memory access address value against the selected at least one of the two contexts.

The address monitor may be configured to generate a system interrupt when the memory access address value is outside the selected at least one of the two contexts.

The monitor may be further configured to receive the at least two contexts and the context change value.

A processor module may comprise: a central processing unit; a memory coupled to the central processing unit; and a monitor as described herein, configured to receive the memory access address values from the central processing unit.

The processor module may further comprise a security block configured to output the at least two contexts and the context change value to the monitor.

According to a second aspect of the application there may be provided a monitor comprising: means for storing at least two contexts and a context change value; and means for selecting at least one of the two contexts for context monitoring dependent on determining the context change value matching a first part of a memory access address.

Each of the at least two contexts may be associated with an identifier value; and wherein the means for selecting may further comprise means for selecting the at least one of the two contexts for context monitoring dependent on a second part of the memory access address matching a context associated identifier value.

Each context may comprise at least one of: an instruction region; a data read region; and a data write region.

The monitor may further comprise means for receiving a data access memory address wherein the data access memory address is the memory access address.

The monitor may further comprise means for receiving a supervisor mode indicator signal indicating a CPU is operating in a supervisor mode.

The monitor may further comprise: means for receiving a memory access address; and means for comparing the memory access address value against the selected at least one of the two contexts.

The monitor may further comprise means for generating a system interrupt when the memory access address value is outside the selected at least one of the two contexts.

The monitor may further comprise means for receiving the at least two contexts and the context change value.

A processor module may comprise: means for operating instructions and processing data; means for storing the instructions and the data; and a monitor as described herein.

The processor module may further comprise means for outputting the at least two contexts and the context change value to the monitor.

According to a third aspect of the application there is provided a method for monitoring memory accesses comprising: storing at least two contexts and a context change value; and selecting at least one of the two contexts for context monitoring dependent on determining the context change value matching a first part of a memory access address.

Each of the at least two contexts may be associated with an identifier value; and wherein selecting may further comprise selecting the at least one of the two contexts for context monitoring dependent on a second part of the memory access address matching a context associated identifier value.

Each context may comprise at least one of: an instruction region; a data read region; and a data write region.

The method may further comprise receiving a data access memory address wherein the data access memory address is the memory access address.

The method may further comprise receiving a supervisor mode indicator signal indicating a CPU is operating in a supervisor mode.

The method may further comprise: receiving a memory access address; and comparing the memory access address value against the selected at least one of the two contexts.

The method may further comprise generating a system interrupt when the memory access address value is outside the selected at least one of the two contexts.

The method may further comprise receiving the at least two contexts and the context change value.

A processor-readable medium encoded with instructions that, when executed by a processor, may perform a method as described above.

Apparatus comprising at least one processor and at least one memory including computer code for one or more programs, the at least one memory and the computer code configured to with the at least one processor may cause the apparatus to at least perform a method as described above.

According to a fourth aspect there is provided a monitor comprising: a register configured to store at least two contexts and a context change value; an input configured to receive a processor data write access address value and an access mode indicator; and a context selector configured to select at least one of the two contexts for context monitoring dependent on a first part of the data write access address value when determining a second part of the data write access address value matches a context change value and the access mode indicator indicates the processor is in a supervisor mode.

According to a fifth aspect there is provided a method of monitoring comprising: storing at least two contexts and a context change value; receiving a processor data write access address value and an access mode indicator; determining a first part of the data write access address value matches the context change value; determining the access mode indicator indicates the processor is in a supervisor mode; and changing the context to a context associated with a second part of the data write access address value.

According to a sixth aspect there is provided a monitor comprising: means for storing at least two contexts and a context change value; means for receiving a processor data write access address value and an access mode indicator; means for determining a first part of the data write access address value matches the context change value; means for determining the access mode indicator indicates the processor is in a supervisor mode; and means for changing the context to a context associated with a second part of the data write access address value.

BRIEF DESCRIPTION OF THE DRAWINGS

For better understanding of the present application, reference will now be made by way of example to the accompanying drawings in which:

FIG. 12 shows a table of example inputs/outputs of the monitor block shown in FIG. 7 according to some embodiments;

FIG. 13 shows a table of an example register arrangement for the monitor block shown in FIG. 7 according to some embodiments;

FIGS. 14 to 17 show tables defining the example register ifetch register related data for the monitor block shown in FIG. 7 according to some embodiments of the application;

FIGS. 18 to 20 show tables defining the example register dfetch register data for the monitor block shown in FIG. 7 according to some embodiments;

FIGS. 21 to 24 show tables defining the example register failure registers for the monitor block shown in FIG. 7 according to some embodiments;

FIG. 25 shows a table defining the example register context address register for the monitor block shown in FIG. 7 in further detail; and FIG. 26 shows a table defining the context identification value register for the monitor block shown in FIG. 7 in further detail.

DETAILED DESCRIPTION OF THE DRAWINGS

The following describes in further detail suitable apparatus and possible mechanisms for the provision of shared memory controlling.

Figure 1:
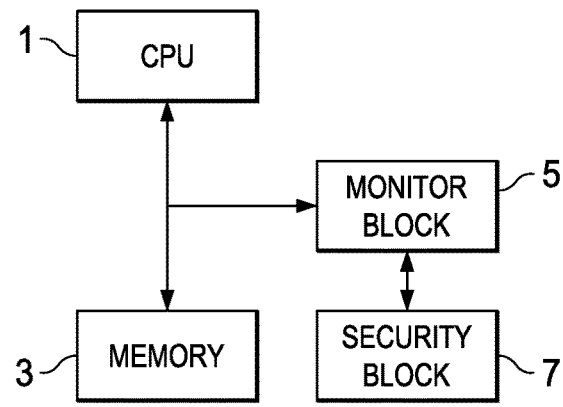
FIG. 1 shows schematically an example apparatus suitable for employing some embodiments of the application.

With respect to FIG. 1 an example system, device or apparatus is shown within which embodiments of the application can be implemented. The apparatus is shown comprising a central processing unit (CPU) 1, coupled to a memory 3 and a monitor block 5. Furthermore the monitor block 5 is shown coupled to a security block 7.

In some embodiments the apparatus or system comprises a central processing unit (CPU) 1, which can be any suitable CPU or CPU core. The CPU 1 can be configured to operate or perform concurrent software processes, for example the CPU 1 can be configured with multiple virtual CPU cores each configured to perform a software process, or in some embodiments the CPU 1 integrated circuit comprises multiple CPU cores each core configured to operate independently of others and execute instructions access data.

In some embodiments the apparatus comprises memory 3 coupled to the CPU 1. The memory 3 can be any suitable memory device configured to store data accessible by the CPU 1. In some embodiments the CPU 1 and the memory 3 are coupled by more thus one bus, for example separate data buses for supplying instruction data from the memory to the CPU and processing data. However it will be understood that in some embodiments instruction data and data can be transferred between the CPU 1 and the memory 3 via the same data bus.

The system in some embodiments further comprises a monitor block 5 coupled to both the CPU 1 and the memory 3, The monitor block 5 can be configured to monitor accesses on the instruction data bus and the data bus.

Furthermore the system comprises a security block 7 configured to be coupled to the monitor block 5 and to receive indications from the monitor block 5 where instructions are executed, and/or data is being accessed outside of the predetermined regions according to some embodiments of the application and thus control the resetting of the system to prevent hacking of the system, illegal data accessing of the system, or insertion of virus or other unwanted code.

The operations of the CPU 1, memory 3, and security block 7 are generally known in the art and will not be described in further detail in order to simplify the explanation of the embodiments of the application.

Figure 2:
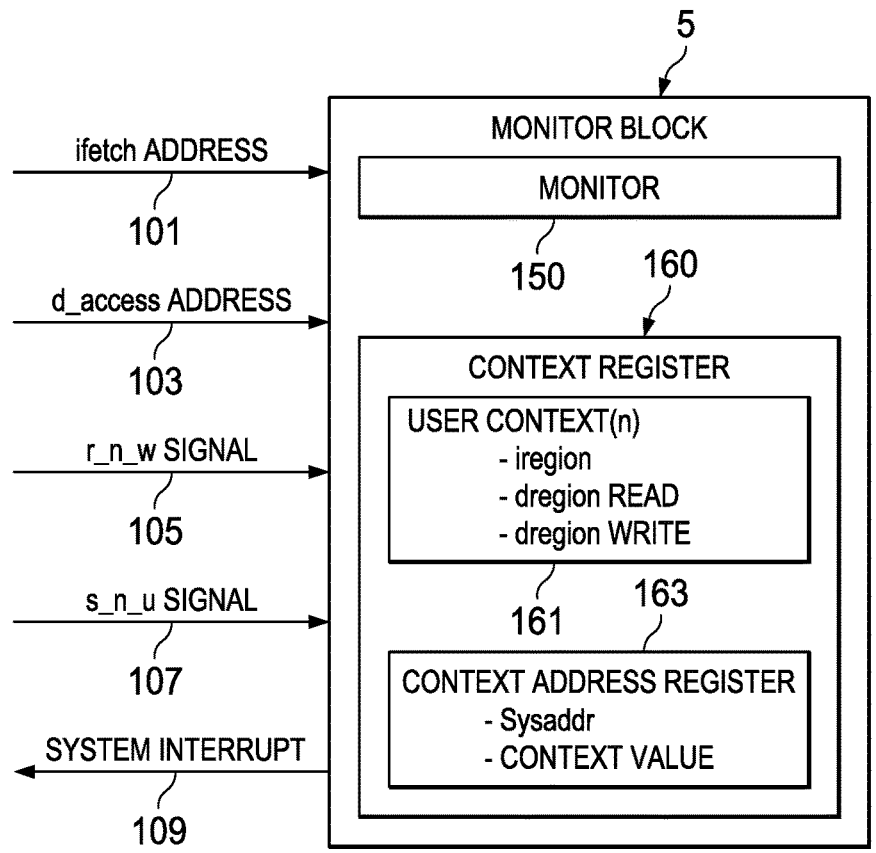
FIG. 2 shows schematically the monitor block in further detail according to some embodiments of the application.

With respect to FIG. 2 an example monitor block 5 according to some embodiments is shown in further detail. The monitor block 5 in some embodiments is configured to monitor various memory accesses between the CPU 1 and the memory 3. For example in some embodiments the monitor block 5 can be configured to receive or snoop the instruction fetch address (ifetch address 101), the data access address (d_access address 103), the read not write indicator of the data fetch (r_n_w signal 105), and the supervisor not user indicator (s_n_u signal 107) which indicated whether the fetch is invoked in a user mode, or by the operating system kernel in supervisor mode. Furthermore in some embodiments the monitor block 5 can be configured to be coupled to the CPU 1 via a system interrupt coupling 109 such that the monitor when detecting a fetch outside of a context can initiate a system interrupt in the CPU 1.

The monitor block 5 can in some embodiments comprise a context register 160. The context register can be configured to store data values used by the monitor block 5 to monitor instruction and/or data accesses to determine whether they are acceptable data or instruction access values and furthermore to store a 'system address' (SysAddr) for quick context switching.

The context register 160 in some embodiments can comprise a first number (n) of user contexts 161. Each user context 161 can be configured to define a region of memory within which an access is valid for that context. In some embodiments the user context 161 comprises an iregion configured to define a region of memory from which instructions can be validly fetched, a dregion read configured to define a region of memory from which data can be validly read from for the context, and a dregion write configured to define a region of memory from which data can be validly written to for the context. The first number (n) can be any suitable number of contexts.

The context register 160 in some embodiments further comprises context address register 163. The context address register can furthermore comprise a system address value (SysAddr) and a new context value.

The monitor block 5 in some embodiments further comprises a monitor 150. The monitor 150 can in some embodiments be any suitable processing entity for monitoring the memory accesses against the context register 160 user contexts 161 and the context address register 163.

The operation of the monitor 150 is described further with respect to the FIGS. 3 to 6.

Figure 3:
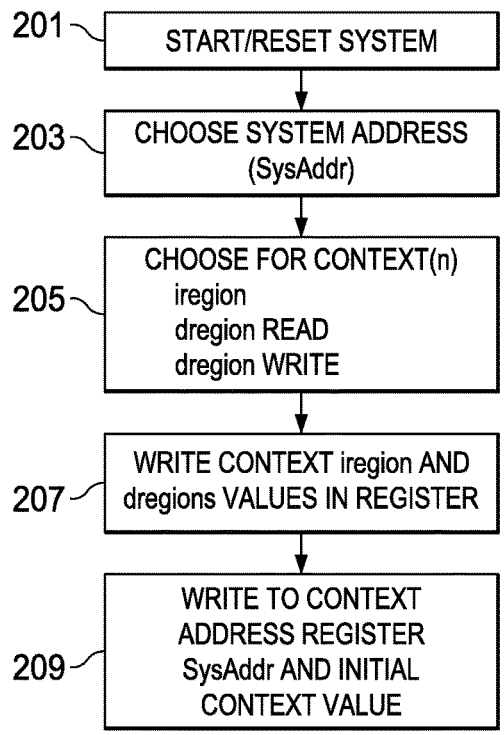
FIG. 3 shows a flow diagram of the operation of the monitor block initialisation according to some embodiments of the application.

With respect to FIG. 3, the operation of the monitor 150 with respect to the initialization of the monitoring is shown in further detail.

The system/apparatus and the associated monitor block 5 and monitor 150 can be started or reset as an initial operation.

The operation of starting or resetting the system is shown in FIG. 3 by step 201.

Furthermore in some embodiments the system address (SysAddr) is chosen defining an address which when output by the CPU indicates a context change. The chosen system address can be any suitable memory address value not already used for some purpose. For example in some embodiments the system address chosen is an unmapped area since the ability to read or write data from the area addressed is irrelevant. In some embodiments the system address can be pre-programmed.

The operation of choosing the system address is shown in FIG. 3 by step 203.

Furthermore in some embodiments for each context a range of associated regions can be chosen in step 205. For example in some embodiments for each context there can be at least one associated instruction address region (iregion) from which addresses instruction accesses from memory are legitimate and allowed for that context, at least one data read address region (dregion read) from which addresses read accesses from memory are legitimate and allowed for that context, and at least one), at least one data write address region (dregion write) from which addresses write accesses from memory are legitimate and allowed for that context.

An iregion, dregion read, and dregion write can comprise in some embodiments an upper bound region address and a lower bound region address. In the following examples the bounds are 8 byte aligned. In some embodiments the region can be "wrapped" where the region_x_upper is less than the region_x_lower. However in some embodiments the regions are not wrapped and are defined as contiguous and monotonic addresses.

In some embodiments each region is separate however it is understood that in some embodiments the regions may at least partially overlap.

The monitor 150 can in some embodiments then write or program, for each context, the iregion, dregion read and dregion write values into the context register 160, and in particular into the user context 161.

The operation of writing each context iregion, dregion read and dregion write values into the context register 160 is shown in FIG. 3 by step 207.

Furthermore the monitor 150 can be configured to write, or program, the system address (SysAddr) and an initial context value to the context register 160, specifically to the context address register 163, in step 209.

Following the writing of the region values and the writing of the system address, the monitor 150 can be configured to begin monitoring the CPU 1 for instruction and data accessing over the ifetch address input, d_access address 103, r_n_w signal 105, s_n_u signal 107.

Figure 4:
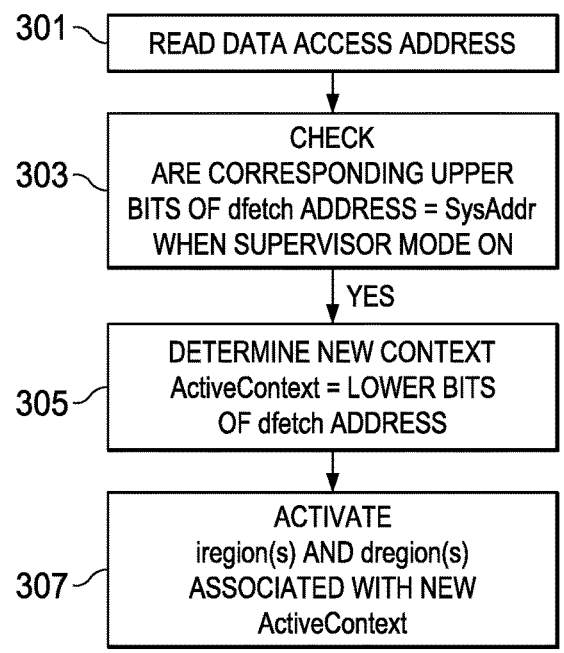
FIG. 4 shows a flow diagram of the operation of the monitor block change context operation according to some embodiments of the application.

With respect to FIG. 4 the monitor 150 switching context operation is shown in further detail.

The monitor 150 can be configured in some embodiments to monitor the CPU data access address values, from the d_access address 103.

The operation of reading CPU data access address values is shown in FIG. 4 by step 301.

The monitor 150 can then furthermore be configured to check whether or not the data access is being carried out in a supervisor mode of operation for example by testing whether the supervisor not user signal (s_n_u signal) 105 is active. Where the supervisor mode is on the system address monitor 150 can be configured to check whether or not the upper bits of the data access address matches the stored context address. In other words whether the CPU data access address matches the system address (SysAddr).

The operation of checking whether the access is in supervisor mode and matches the system address stored in the context address register 163 is shown in FIG. 4 by step 303.

The monitor 150, having determined that the system address access has been correctly detected, can then be configured to determine the new or active context using the remaining lower bits of the data access address.

The operation of determining the new context value from the lower or least significant bits of the d_access address is shown in FIG. 4 by step 305.

The monitor 150 then can be configured to activate the iregions, the dregion write and dregion read values associated with the active context value.

The operation of activating the appropriate iregion, dregion write and dregion read is shown in FIG. 4 by step 307.

In such embodiments it can be possible to change context within a single instruction cycle depending on how quick the system address match, supervisor mode match and activation region operations are. As has described herein the system address (SysAddr) region is chosen to be somewhere in the address map to which writes are harmless. Furthermore as soon as the new user process starts executing the monitor block will already be enforcing the associated user context.

Figure 5:
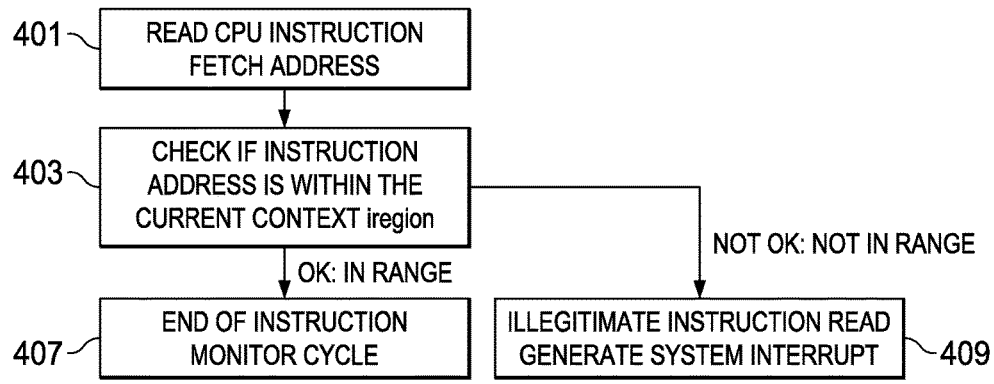
FIG. 5 shows a flow diagram of the operation of the monitor block instruction check operation according to some embodiments of the application.

The operation of enforcing an instruction fetch monitoring by the monitor 150 is shown with respect to FIG. 5. In such embodiments the monitor 150 reads the CPU ifetch address accesses to determine whether or not an illegitimate instruction request has been generated. The monitor 150 can thus in some embodiments read the CPU instruction access ifetch address 101.

The operation of reading the CPU instruction access is shown in FIG. 5 by step 401.

The monitor 150 can then check whether or not the instruction access address is within the current (i.e., the active) context iregion address range.

Where the instruction is not in the range of the instruction region (iregion) addresses then the operation passes to the determination of an illegitimate instruction read.

The operation of checking whether the instruction is within the current context address region is shown in FIG. 5 by step 403.

In some embodiments the monitor 150, having passed the check determines that the instruction monitor cycle has ended and the instruction fetch is legitimate.

Furthermore the end of instruction monitor cycle operation is shown in FIG. 5 by step 407.

In some embodiments, when the range check is failed, then the monitor 150 is configured to generate a system interrupt signal in step 409 output on the system interrupt coupling 109 to the CPU. The system interrupt signal can in some embodiments be used by the CPU to indicate that an illegitimate instruction for the current user context is being accessed.

Figure 6:
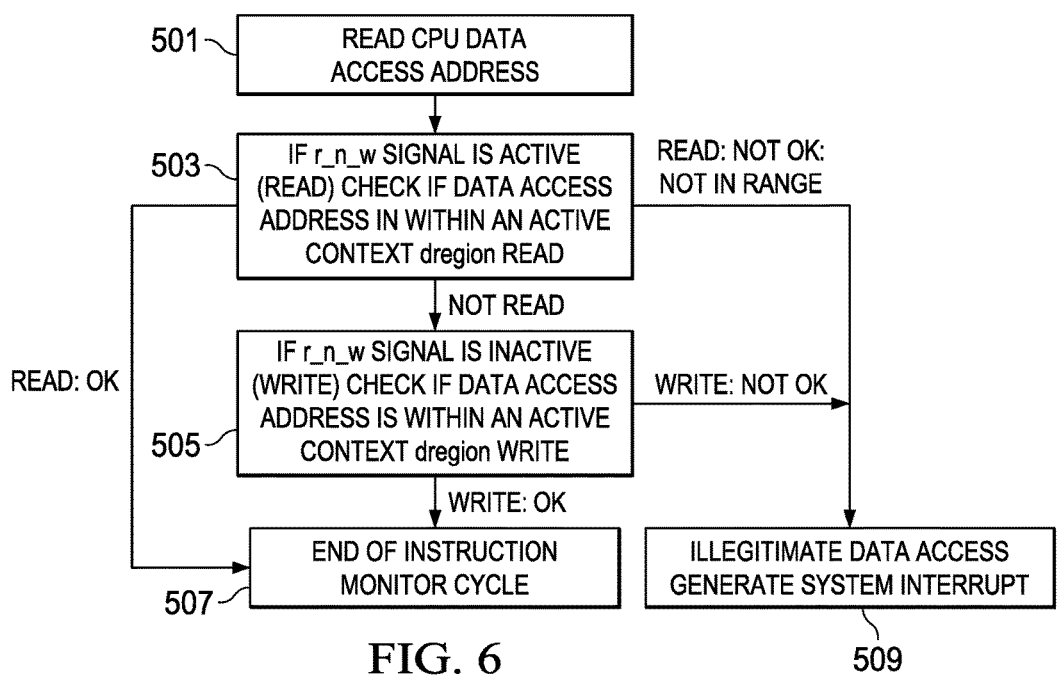
FIG. 6 shows a flow diagram of the operation of the monitor block combination check operation according to some embodiments of the application.

With respect to FIG. 6 the operation of enforcing a data access by the monitor 150 is shown. In such embodiments the monitor 150 reads the CPU d_access address 103 and the read not write signal (r_n_w signal) 105 to determine whether or not an illegitimate data request has been generated.

The operation of reading the CPU data access value and the read not write signal is shown in FIG. 6 by step 501.

The monitor 150 can in some embodiments where the read not write signal is active, in other words the data access is a read access, be configured to check the data access is within an active (in other words, current) context dregion read address region.

The operation of checking whether the data access as a read is within the active context dregion read address region is shown in FIG. 6 by step 503.

The monitor 150 can in some embodiments where the read not write signal is not active, in other words the data access is a write access, be configured to check the data access is within the active context dregion write address region.

The operation of checking whether the data access as a write is within the active context dregion write address region is shown in FIG. 6 by step 505.

Where the data access is not within the active context dregion, dregion read for a read access and dregion write for a write access, then the monitor 150 can be configured to generate a system interrupt signal output on the system interrupt coupling 109 to the CPU. The system interrupt signal can in some embodiments be used by the CPU to indicate that an illegitimate data access for the current user context is being processed.

The operation of generating an illegitimate data access system interrupt is shown in FIG. 6 by step 509.

Where the data access is within the active context dregion, dregion read for a read access and dregion write for a write access, then the monitor 150 can be configured to end the data monitor cycle.

The ending of the data monitor operations is shown in FIG. 6 by step 507.

It would be understood that the CPU can be configured to respond to the system interrupt in any suitable manner.

Figure 7:
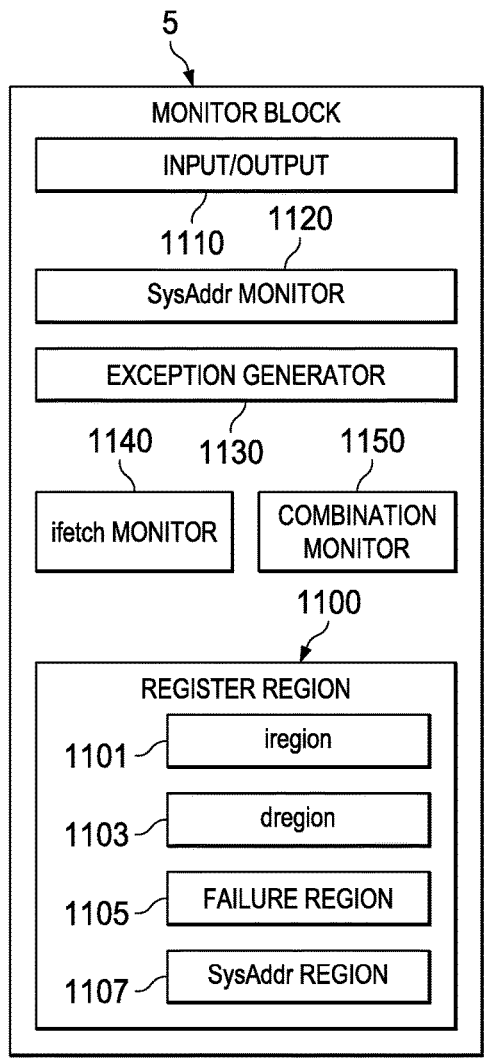
FIG. 7 shows schematically the monitor block in further detail according to some further embodiments of the application.

With respect to FIG. 7 a further example monitor block 1005 according to some embodiments is shown in further detail. The monitor block 1005 in some embodiments comprises an input/output block 1110 configured to monitor the memory accesses between the CPU 1 and the memory 3 and also communicate with the security block 7, such as to output indicators to the security block 7 or receive 'range' data from security block 7 when required.

With respect to FIG. 12 a table showing example inputs and outputs for the input/output block are shown. In particular the inputs can in some embodiments comprise at least one instruction bus monitor input 1601, at least one data bus monitor input 1603 and at least one output to the security block 7 (shown by the fetch_exception input 1605)

The instruction bus monitor input 1601 in this example are shown as the instruction bus monitor (cpu_ifetch_addr<31:4>), an instruction fetch monitor (cpu_ifetch_active), and an input determining whether the instruction fetch is a supervisor instruction or a user instruction (cpu_ifetch_sup).

Furthermore in some embodiments the data bus monitor input 1603 comprises a data access address monitor (cpu_d-fetch_d_addr<31:4>), a data access monitor (cpu_d-fetch_active), and an input determining whether the data is being written or read from the accessed address (cpu_d-fetch_rnw).

The monitor block 5 can furthermore comprise a register region 1100. The register region or hardware register region can be configured to store data values used by the monitor block 5 to monitor instruction and/or data accesses to determine whether they are acceptable data or instruction access values.

The register region 1100 in some embodiments can comprise an ifetch region (iregion) 1101, a dfetch region (dregion) 1103, a failure region 1105 and a system address (SysAddr) region 1107.

The ifetch region 1101 can for example comprise a series of register values indicating regions of instruction memory region addresses associated with each context or software process from which the context/software process can legitimately retrieve instructions.

An example of the ifetch region 1101 can be shown for example with respect to FIG. 13 wherein the ifetch region 1101 can be subdivided into n regions (where for this example n=0 to 63). The ifetch region 1101 can in some embodiments for each region comprise an ifetch region lower address bound (ifetch_region_<n>_lower), an ifetch region upper address bound value (ifetch_region_<n>_upper), a tag identification value (ifetch_region_<n>_tag), and a enable and supervisor/user control indicator (ifetch_region_<n>_sup_en).

With respect to FIGS. 14, 15, 16 and 17 the lower bound, upper bound, tag and supervisor/user control registers are shown in further detail according to some embodiments.

With respect to FIG. 14 the lower bound ifetch region register definition is shown according to some embodiments of the application. The lower bound register has in such embodiment data defining the lower address bound value (for the ifetch region n) in this example the value is defined as the bits from positions 31:4 of the register. However it would be understood that the lower bound value can use any suitable bit configuration and define any form of address as used by the CPU.

With respect to FIG. 15 the upper bound ifetch region register definition is shown according to some embodiments of the application. An upper bound address value for the ifetch region n can in this example be defined by the values of bits from positions 31:4 of the 32 bit register. However in other embodiments any suitable register configuration defining an address as used by the CPU can be used.

With respect to FIG. 16 the tag register definition according to some embodiments is shown wherein an 8 bit value (bit positions 7:0 of the tag register) defines the tag value for the ifetch region n.

With respect to FIG. 17 the supervisor and enable register definition is shown according to some embodiments of the application. In some embodiments (such as shown in FIG. 17) an enable flag bit value is defined by bit position 0 of the supervisor and enable register. Furthermore a supervisor flag bit value is defined by bit position 1 of the supervisor and enable register and defines a supervisor flag defining whether or not the instruction within the address boundaries is a supervisor or user instruction. In some embodiments a supervisor enabled flag bit, for example bit position 2 of the supervisor and enable register can defines a supervisor enabled instruction flag.

The dfetch region 103, as shown in FIG. 13, can also for each region, from n=0 to 63 be subdivided into four parts. The dfetch region register 103 can in some embodiments comprise a lower bound address dfetch region (dfetch_region_<n>_lower), an upper bound address dfetch region (dfetch_region_<n>_upper), an enable and read only control configuration region (dfetch_region_<n>_config) and a reserved region. It will be understood that in some embodiments only the first three of these are required.

With respect to FIG. 18 an example definition of the lower bound dfetch region register is shown wherein the dfetch lower bound address, for region n, is defined by the values of bit positions 31:4 of the register. It would be understood that the lower bound dfetch address can be any suitable configuration or bit position arrangement of values.

With respect to FIG. 19 an example definition of the upper bound region register is shown wherein the dfetch upper bound address, for region n, is defined by the values of bit positions 31:4 of the register. It would be understood that the upper bound dfetch address can be defined by any suitable arrangement of bits.

With respect to FIG. 20 an example definition of the configuration dfetch register is shown. The configuration dfetch register can be configured with a single bit flag determining the acceptable read or write state of the dfetch region. In this example bit position 0 of the register is used as the indicator wherein an active or '1' value is defined as indicating that the dfetch region is read only (RO), and an inactive or '0' value is indicative that the dfetch region is read write (RW).

Furthermore in some embodiments the configuration dfetch register can be configured with a further bit flag indicator indicating whether or not the region is 'enabled'. In this example bit position 1 of the configuration dfetch register is used as the enable flag.

The failure region 105 as shown in FIG. 13 in some embodiments can be divided into a series of failure register indicators. For example the failure region 105 can in some embodiments comprise a failure status register (failure_status), an illegitimate instruction fetch address value indicator (ifetch_failure_addr), a data address exception (dfetch_failure_addr), and a last 'good' instruction fetch address value (ifetch_good_addr).

With respect to FIG. 21 an example definition of the failure status (failure_status) register is shown. The failure status register can in some embodiments define a first flag bit, for example at bit position 0, defining when an ifetch outside any active iregion is attempted (Ifetch). Furthermore in some embodiments the failure status register can comprise a further flag bit, for example at bit position 1, defining a invalid ifetch/dfetch combination (comb).

With respect to FIG. 22 an example definition of the ifetch failure address (ifetch_failure_addr) register is shown. The ifetch failure address register can in some embodiments define a first flag bit, for example at bit position 0, defining when whether the CPU was in a supervisor mode when an exception was raised (sup). Furthermore in some embodiments the ifetch failure address register can comprise a value, for example at bit positions 3:1, defining the active context when an exception was raised (context) and a further value, bit positions 31:4, defining the code address (value) causing the exception.

With respect to FIG. 23 an example definition of the dfetch failure address (dfetch_failure_addr) register is shown. The dfetch failure address register can in some embodiments define a first flag bit, for example at bit position 0, defining when whether the CPU was in attempting a read or write access when an exception was raised (rnw). Furthermore in some embodiments the dfetch failure address register can comprise a value, for example at bit positions 31:4, defining the data address which caused the ifetch/dfetch combination exception.

With respect to FIG. 24 an example definition of the ifetch last good instruction address (ifetch_good_addr) register is shown. The ifetch last good instruction address register can in some embodiments define a value, for example at bit positions 31:4, defining the code address of the last instruction executed that was from an enabled region.

In some embodiments, as shown in FIG. 13, the register region 1100 SysAddr region 1107 can comprise a context address (context$_{13}$ address) register defining the "magic" address.

With respect to FIG. 25 an example definition of the context address register (context_address) is shown according to some embodiments. The context address register can define a value, for example at bit positions 31:7 of the register (value), which defines a 'magic value' which when the CPU attempts to access occurs indicates that the current context is to be changed. Furthermore the context address register can comprise a further value, for example at bit positions 6:4 of the register (current_context), which define an initial context value.

Furthermore as shown in FIG. 13 the register region 1100 can comprise in some embodiments a context identification value register 1109 where the context identification register 8 byte addresses contain 6 bit context identification values (CID). There is in some embodiments one CID per context. The context manager in these embodiments can be configured to output the CID of the current context so that the system on chip (SOC) bus knows which use context is currently operating and this allows the SOC hardware to enforce context-sensitive security measures.

With respect to FIG. 26 an example definition of the context identification register (CID_n) is shown according to some embodiments. The context identification register can in some embodiments comprise a 6 bit value, for example register bit positions 5:0 (CID), which define a 6 bit context identification (CID) value to be used to identify the context.

The monitor block 5 in some embodiments further comprises a system address (SysAddr) monitor 1120. The system address monitor 1120 is configured to initialise the register region 1100 and furthermore to monitor the system address value to determine whether a context has been changed and to therefore activate the current context values.

Figure 8:
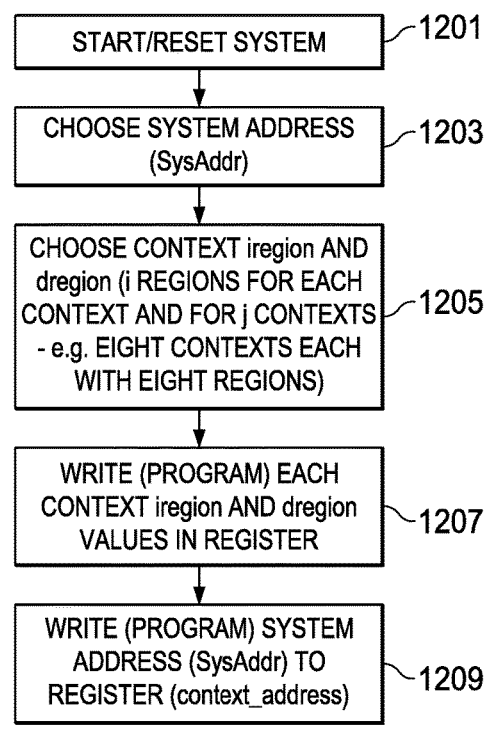
FIG. 8 shows a flow diagram of the operation of the monitor block shown in FIG. 7 initialisation according to some embodiments of the application.

With respect to FIG. 8 the operation of the initialisation of the system address monitor 1120 is shown in further detail.

The system/apparatus can be started or reset as an initial operation.

The operation of starting or resetting the system is shown in FIG. 8 by step 1201.

Furthermore in some embodiments the system address is chosen defining an address which when output by the CPU indicates a context change. The chosen system address can be any suitable memory address value not already used for some purpose. For example in some embodiments the system address chosen is an unmapped area since the ability to read or write data from the area addressed is irrelevant. In some embodiments the system address is chosen by the security block 7. In some embodiments the functionality of the security block can be merged with the monitor block 5. In the example shown the system address (SysAddr) is chosen to be a 128 byte region ($2^n$ where n is the number of contexts and in this example n=8) in the system address space.

The operation of choosing the system address is shown in FIG. 8 by step 1203.

Furthermore in some embodiments the security block 7 can be configured to choose or define in step 1205 for each context at least one instruction address region (iregion) and at least one data address region (dregion) from which accesses are legitimate and allowed. In the following examples the security block 7 is configured to define for each of eight contexts eight regions of instruction addresses and eight regions of data addresses. In other words, for this example with 8 contexts, defining up to 64 regions.

An iregion can comprise in some embodiments an upper bound region address and a lower bound region address. In the following examples the bounds are 8 byte aligned. In some embodiments the region can be "wrapped" where the region_x_upper is less than the region_x_lower. However in some embodiments the regions are not wrapped and are defined as contiguous and monotonic addresses.

In some embodiments each region is separate however it is understood that in some embodiments the regions may at least partially overlap. As described herein an iregion can be configured to define a region where the CPU can legitimately access code instructions, together with defining some flags or indicators determining whether the instruction code is allowed to be executed in a CPU supervisor and/or user mode, and defining an 8 bit "tag" field which indicates which dregions the code from the iregion is allowed to access data from.

Furthermore the dregion can in some embodiments be configured to describe regions containing legitimately addressable data, a flag or indicator determining whether the data is read only (RO) or read write (RW) and an enable bit.

Although the examples described herein show a context comprising 8 iregions and 8 dregions the number of iregions and dregions assigned to each context can in some embodiments be dynamic, and furthermore in some embodiments be more than or fewer than 8 regions per context. Furthermore, although the examples shown define regions for eight contexts more than or fewer than eight contexts have regions be defined in some embodiments of the application.

The system address monitor 1120 can in some embodiments then write or program, for each context the iregion and dregion values into the register region 1100.

The operation of writing each context iregion and dregion values into the register is shown in FIG. 8 by step 1207.

Furthermore the system address monitor 1120 can be configured to write, or program, in step 1209 the system address (SysAddr) to the register region 1100 system address region and in particular the context address register (context_address).

Following the writing of the context iregion and dregion values and the writing of the system address, the system address monitor 1120 can be configured to activate the monitor block 5 to begin monitoring the CPU 1 for an instruction and data accessing.

Figure 9:
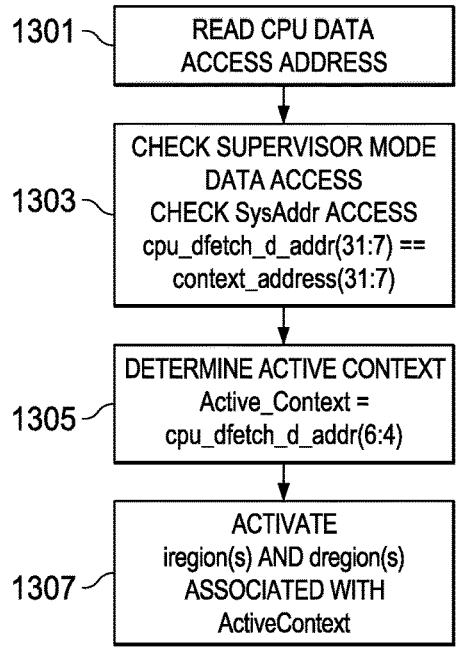
FIG. 9 shows a flow diagram of the operation of the monitor block shown in FIG. 7 change context operation according to some embodiments of the application.

With respect to FIG. 9 the system address monitor 1120 switching context operation is shown. The system address monitor 1120 can be configured, for example, to read CPU data access address values.

The operation of reading CPU data access address values is shown in FIG. 9 by step 1301.

The system address monitor 1120 can then furthermore be configured to check whether or not the data access is being carried out in a supervisor mode of operation. Furthermore the system address monitor 1120 can be configured to check whether or not the data access address matches the stored context address, in other words is the following expression met cpu_dfetch_d_addr(31:7)=context_address(31:7). In other words whether the CPU data fetch address matches the magic address (or system address).

The operation of checking whether the access is in supervisor mode and matches the context address value is shown in FIG. 9 by step 1303.

The system address monitor 1120, having determined that the system address access has been correctly detected, can then be configured to determine the new or active context in step 1305. For example in some embodiments the active context value can be defined as the value defined by the cpu_dfetch_d_addr(6:4) data. In other words, defining new context(m) where m is taken to be the unsigned integer value given by cpu_dfetch_d_addr(6:4).

In some embodiments it can be a system requirement that the CPU must not switch to a context whilst the security block is reprogramming the context, since there is no resynchronization of the context registers clocked by the security block bus (clk_stbus) when they are copied to the active context register clocked by the CPU clock.

The system address monitor 1120 then can be configured to activate the ifetch regions (i.e., iregion(s)), the dfetch regions (i.e., dregion(s)) associated with the active context value. In some embodiments this can comprise activating the enable flag values for the ifetch and dfetch register regions 100.

The operation of activating the appropriate ifetch and dfetch regions is shown in FIG. 9 by step 1307.

Furthermore in some embodiments on determining the active context the system address monitor 1120 can be configured to read and output the context identification value taken from the look up table initialised by the security block in the context identification (CID_n) registers.

The monitor block in some embodiments comprises an ifetch monitor 1140. The ifetch monitor 1140 can be configured to monitor the CPU ifetch address accesses to determine whether or not an illegitimate instruction request has been generated. The ifetch monitor 1140 can thus in some embodiments read the CPU instruction access.

Figure 10:
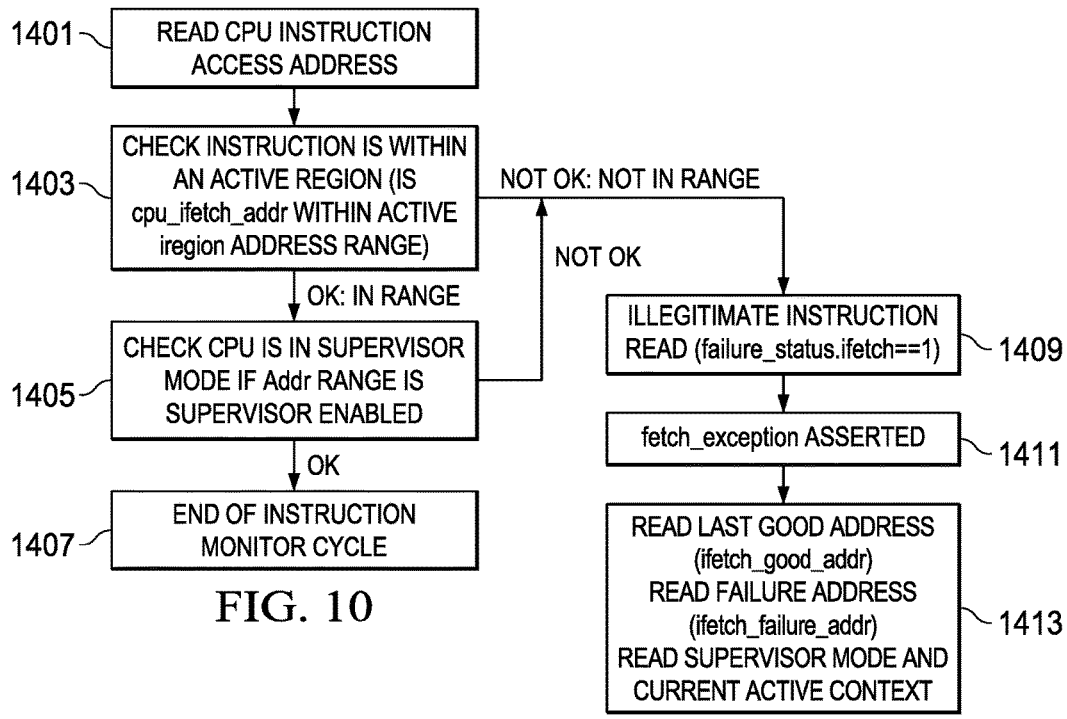
FIG. 10 shows a flow diagram of the operation of the monitor block shown in FIG. 7 instruction check operation according to some embodiments of the application.

The operation of reading the CPU instruction access is shown in FIG. 10 by step 1401.

The ifetch monitor 1140 can then check whether or not the instruction is within an active region. In other words the ifetch monitor 1140 reads the lower and upper bound address values for the active context to determine whether or not the current CPU ifetch address lies within any of these active regions. (If CPU_ifetch_ADDR within active i-region address range). Where a region is not wrapped than an address within the region if, region_x_lower<=address AND region_x_upper>address, where a region is wrapped then the address is within the region if, region_x_lower<=address OR region_x_upper>address.

Where the instruction is not in the range of any of the instruction region addresses then the operation passes to the determination of an illegitimate instruction read, however if the instruction is within the active region then the operation passes to the supervisor check.

The operation of checking whether the instruction is within the active region is shown in FIG. 10 by step 1403.

Where the instruction is within the active region then the ifetch monitor 1140 can be configured to check the central processing unit is within a supervisor mode where the address range defines that it is supervisor enabled only. In other words where the range determines that mode checking is enabled such as shown in ifetch_sup_en(2) being set the CPU is checked whether or not the supervisor mode specified in ifetch_sup_en(1) is equal to the supervisor mode input cpu_ifetch_sup.

The operation of the supervisor mode check is shown in FIG. 10 by step 1405.

Where the check is ok then the ifetch monitor 1140 determines that the instruction monitor cycle has ended and the instruction fetch is legitimate. However where the check is not ok the operation passes to the illegitimate instruction read operation.

Furthermore the end of instruction monitor cycle operation is shown in FIG. 10 by step 1407.

Where either the range check or the supervisor mode check is failed then the ifetch monitor 1140 is configured to indicate to the exception generator 1130 that a failure has occurred.

In some embodiments the monitor block 5 comprises an exception generator 1130 configured to receive an indicator from the ifetch monitor 1140 and/or combination monitor 1150 that a failed check has been made. The exception generator 1130 can furthermore be configured to determine whether or not it is an ifetch monitor failure or a combination monitor failure.

The exception generator 1130 on detecting an ifetch monitor failure indicator to initialise an illegitimate instruction read operation. The exception generator 1130 in such embodiments can be configured to, where the failure status of the ifetch indicator is '0' to set the failure status ifetch indicator to '1' (failure_status.ifetch==1).

The operation of reading the illegitimate instruction and setting the failure status is shown in FIG. 10 by step 1409.

Furthermore the exception generator 1130 can be configured to assert the fetch exception register (fetch_exception).

The operation of asserting the fetch exception register is shown in step 1411 of FIG. 10.

Furthermore the exception generator 1130 in some embodiments can be configured to read the last good address (ifetch_good_addr), read the failure address (ifetch_failure_addr). Furthermore in some embodiments the exception generator 1130 can be configured to read the supervisor mode and current active context of value.

The operation of reading the last good address, failure address and supervisor and current active context modes is shown in FIG. 10 by step 1413.

The exception generator 1130 in some embodiments can be configured to output these values to the security block 7. The security block 7 can then, on receipt of these values, initialise a system reset to prevent any further hacking, or prevent the software context from executing the illegitimate instruction code.

The monitor block 5 in some embodiments can further comprise a combination monitor 1150. The combination monitor 150 can be configured to monitor the data access and instruction region values to determine where a data access to the memory is illegitimate.

The combination monitor 1150 can be configured in some embodiments to read the CPU data/instruction values.

Figure 11:
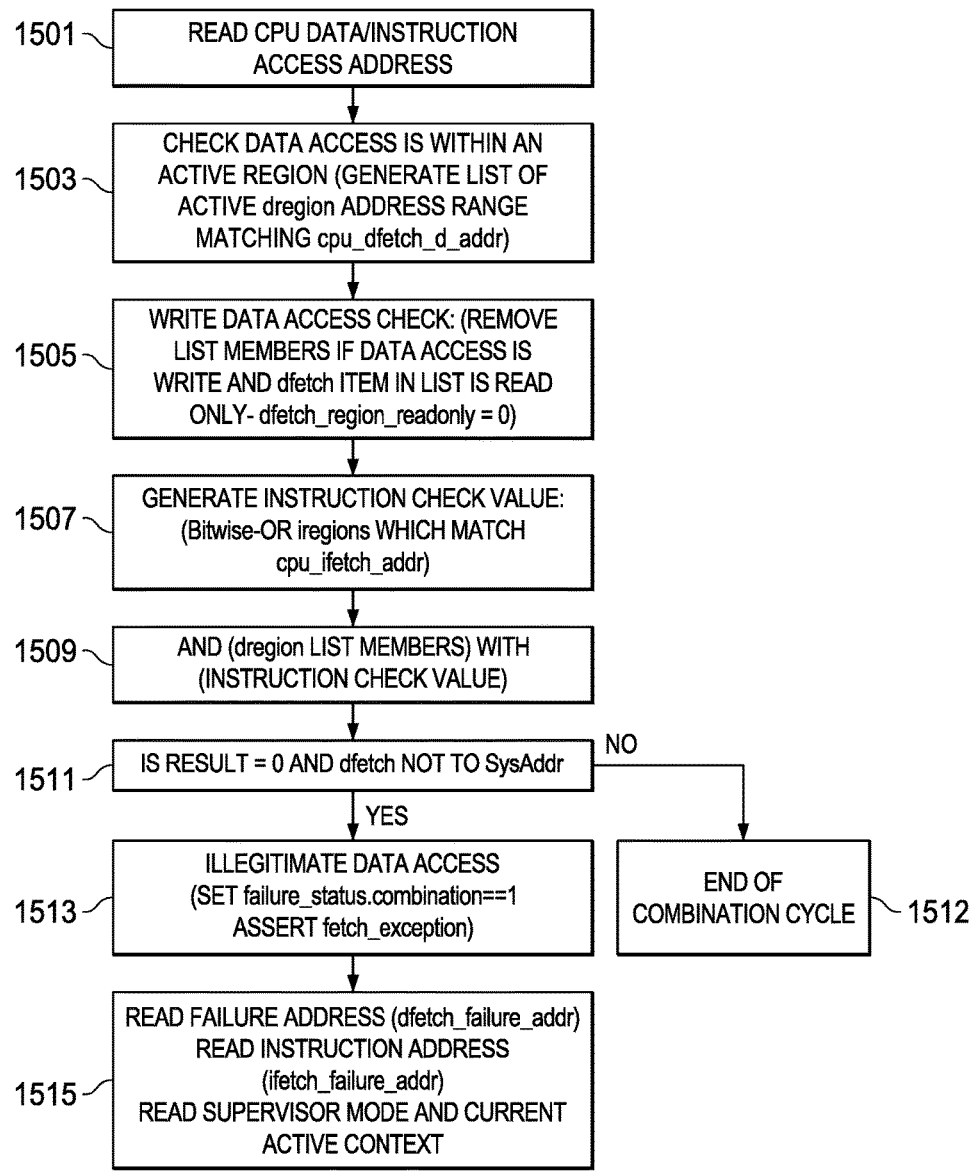
FIG. 11 shows a flow diagram of the operation of the monitor block shown in FIG. 7 combination check operation according to some embodiments of the application.

The operation of reading the CPU data/instruction values is shown in FIG. 11 by step 1501.

The combination monitor 1150 can furthermore be configured to check the data access is within an active region.

In some embodiments the operation of checking the data accesses within the active region comprises generating a list of the active dregion address ranges matching the CPU data fetch values (cpu_dfetch_d_addr).

The operation of generating the list of active dregion address range matching the CPU dfetch address values is shown in FIG. 11 by step 1503.

Furthermore the combination monitor 1150 can be configured to perform a data access check. A data access check can comprise removing any list members where the data access is write and the data fetch item in the list is defined as being read only. In other words that the dfetch_region_readonly flag is set to '1' whereas the data access is a write access.

The operation of removing list members where the data access is write and the item in the list is read only is shown in FIG. 11 by step 1505.

The combination monitor 1150 can then be configured to generate a combination check value. A combination check value can in some embodiments comprise bit wise 'OR'ing the iregions which match the cpu_ifetch_addr values.

The instruction check value generation operation is shown in FIG. 11 by step 1507.

The combination monitor 1150 can then be configured to generate a combination value wherein the dregion list members are AND'ed with the instruction check value.

The operation of generating the combination check value is shown in FIG. 11 by step 1509.

The combination monitor 1150 can then be configured to perform a null result check in other words whether or not the combination value result is equal to 0 and furthermore whether or not the dfetch is not equal to the system address.

The operation of performing the null result check is shown in FIG. 11 by step 1511.

Where the result equals 0 and the dfetch is not to the system address then an indicator is passed to the exception generator 1130 that there has been an illegitimate data access.

Where the result is either not equal to 0 or the dfetch is to the system address then the combination monitor cycle is ended.

The operation of ending the combination cycle is shown in FIG. 11 by step 1512.

The exception generator 1130 can be configured in some embodiments on detecting an indicator from the combination monitor that an illegitimate data access has occurred to set the failure status combination register value to 1 (failure_status.comb==1) and further to assert the fetch exception value (fetch_exception).

The operation of initializing an illegitimate data access response at the exception generator is shown in FIG. 11 by step 1513.

Furthermore in some embodiments the exception generator 1130 on determining an failure status combination set can be configured to read the failure address (dfetch_failure_addr), to read the instruction address associate with the failure address (ifetch_failure_addr) and to furthermore read the supervisor mode and current active mode context values.

The operation of reading the failure address, instruction address and supervisor mode and current active context values is shown in FIG. 11 by step 1515.

In other words while the value of failure_status.comb="1", the dfetch failure address can be read which contains the address of the illegitimate data access.

Furthermore the ifetch failure address contains the address of the instruction that did the illegitimate data access. It will be noted that in some embodiments the ifetch_good_address can be read however can only be relied on where the failure_status.ifetch value is also equal to 1.

In some embodiments the exception generator 1130 can be configured to output the fetch_exception value as being asserted whenever any bit of the value_status register is set. The failure_status register can be cleared on writing to it. Furthermore the failure_status register can be synchronous with the clock CPU value. It would be understood that the failure address registers and the ifetch good address registers are undefined while a fetch exception value is not asserted as they are clocked by the CPU clock and not resynchronised into the security bus domain. However they are guaranteed to be stable while the fetch and exception value is asserted.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this application may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A monitor, comprising:
   a register configured to store at least two contexts and a context change value, wherein each context includes information defining a range of addresses in memory that is permitted for instruction fetch access or data read/write access by a software process executed by a processing unit, and wherein each of the at least two contexts is associated with an identifier value;
   a context selector circuit configured to select one of the at least two contexts for context monitoring dependent on determining that the context change value stored in the register matches a first part of a data access address output by the processing unit, and wherein the context selector circuit selects said selected one of the at least two contexts for context monitoring dependent on whose identifier value matches a second part of the data access address output by the processing unit; and
   an address monitor circuit configured to receive a memory access address output by the processing unit for an instruction fetch access or a data read/write access requested by the executed software process and compare a value of the memory access address against the information defining the permitted range of addresses in memory for the selected one of the at least two contexts, said address monitor circuit further configured to raise an interrupt of processing unit execution of the software process if the memory access address is outside of the permitted range of addresses in memory for the selected one of the at least two contexts.

2. The monitor as claimed in claim 1, wherein the range of addresses in memory for each context comprises at least one of: an instruction range of addresses; a data read range of addresses; and a data write range of addresses.

3. The monitor as claimed in claim 1, wherein the context selector circuit is further configured to receive a supervisor mode indicator signal and to select said one of the at least two contexts for context monitoring only if the supervisor mode indicator signal indicates that the processing unit is operating in a supervisor mode and the first part matches the context change value.

4. A monitor, comprising:
   a storage circuit configured to store at least two contexts and a context change value, wherein each context includes information defining a range of addresses in memory that is permitted for instruction fetch access or data read/write access by a software process executed by a processing unit, and wherein each of the at least two contexts is associated with an identifier value;
   a selection circuit configured to select between the at least two contexts for context monitoring if a first part of a data access address output by the processing unit matches the context change value stored by the storage device, and wherein the selection circuit is further configured to select one of the two contexts for context monitoring whose identifier value matches a second part of the data access address; and
   an address monitor circuit configured to receive a memory access address output by the processing unit for an instruction fetch access or a data read/write access requested by the executed software process and compare a value of the memory access address against the information defining the permitted range of addresses in memory for the selected one of the at least two contexts, said address monitor circuit further configured to raise an interrupt of processing unit execution of the software process if the memory access address is outside of the permitted range of addresses in memory for the selected one of the at least two contexts.

5. The monitor as claimed in claim 4, wherein the range of addresses in memory for each context comprises at least one of: an instruction range of addresses; a data read range of addresses; and a data write range of addresses.

6. The monitor as claimed in claim 4, further comprising an input configured to receive a supervisor mode indicator signal, the selection circuit configured to select one of the at least two contexts for context monitoring only if the supervisor mode indicator signal indicates that the processing unit is operating in a supervisor mode and the first part matches the context change value.

7. The monitor as claimed in claim 4, wherein the address monitor circuit comprises a comparator circuit configured to compare a value of the memory access address against the selected one of the at least two contexts.

8. The monitor as claimed in claim 7, wherein the address monitor circuit comprises an interrupt output configured to generate a system interrupt when the value of the memory access address is outside the permitted range of addresses in memory for the selected one of the at least two contexts.

9. A method for monitoring memory accesses, comprising:
   storing at least two contexts and a context change value, wherein each context includes information defining a range of addresses in memory that is permitted for instruction fetch access or data read/write access by a software process executed by a processing unit, and wherein each of the at least two contexts is associated with an identifier value;
   determining whether a first part of a data access address output by the processing unit matches the stored context change value;
   if the first part of the memory access address matches the stored context change value:

determining whether a second part of the data access address matches an identifier value associated with one of the at least two contexts; and selecting one of the at least two contexts for context monitoring whose identifier value matches the second part of the data access address;

comparing a value of a memory access address output by the processing unit for instruction fetch access or a data read/write access requested by the executed software process against the information defining the permitted range of addresses in memory for the selected one of the at least two contexts; and raising an interrupt of processing unit execution of the software process if the memory access address is outside of the permitted range of addresses in memory for the selected one of the at least two contexts.

10. The method as claimed in claim 9, wherein the range of addresses in memory for each context comprises at least one of: an instruction range of addresses; a data read range of addresses; and a data write range of addresses.

11. The method as claimed in claim 9, further comprising:
receiving a supervisor mode indicator signal; and
selecting said one of the at least two contexts for context monitoring only if the supervisor mode indicator signal indicates that the processing unit is operating in a supervisor mode and the first part matches the stored context change value.

\* \* \* \* \*

UNITED STATES PATENT AND TRADEMARK OFFICE
CERTIFICATE OF CORRECTION

| | | |
|---|---|---|
| PATENT NO. | : 9,753,870 B2 | Page 1 of 1 |
| APPLICATION NO. | : 13/705315 | |
| DATED | : September 5, 2017 | |
| INVENTOR(S) | : Mark Trimmer et al. | |

It is certified that error appears in the above-identified patent and that said Letters Patent is hereby corrected as shown below:

In the Specification

At Column 11, Line number 30, please replace the term [[(context$_{13}$ address)]] with the term -- (context_address) --.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*